(12) United States Patent
Becker

(10) Patent No.: US 7,260,913 B2
(45) Date of Patent: Aug. 28, 2007

(54) METHOD OF MAKING FISHING JIG LURE

(75) Inventor: Damion D. Becker, East Bethel, MN (US)

(73) Assignee: Glow Optics, LLC, Alpharetta, GA (US)

( * ) Notice: Subject to any disclaimer, the term of this patent is extended or adjusted under 35 U.S.C. 154(b) by 0 days.

(21) Appl. No.: 11/514,057

(22) Filed: Sep. 1, 2006

(65) Prior Publication Data

US 2007/0000166 A1   Jan. 4, 2007

Related U.S. Application Data

(62) Division of application No. 11/100,281, filed on Apr. 6, 2005.

(60) Provisional application No. 60/559,706, filed on Apr. 6, 2004.

(51) Int. Cl.
*A01K 85/00*   (2006.01)

(52) U.S. Cl. .................. 43/17.6; 43/42.37; 43/42.36; 43/42.39

(58) Field of Classification Search ............. 43/17.6, 43/42.37, 42.36, 42.39; 65/21.1
See application file for complete search history.

(56) References Cited

U.S. PATENT DOCUMENTS

| 2,963,824 | A | * | 12/1960 | Pinotti | ..................... | 65/21.2 |
| 3,724,117 | A | * | 4/1973 | Flanagan, Jr. | .............. | 43/42.24 |
| 5,245,783 | A | * | 9/1993 | Cumiskey | .................. | 43/42.37 |
| 6,286,246 | B1 | * | 9/2001 | Rachal et al. | .............. | 43/42.25 |

* cited by examiner

*Primary Examiner*—Darren W. Ark
*Assistant Examiner*—John D. Holman
(74) *Attorney, Agent, or Firm*—Richard John Bartz

(57) ABSTRACT

A fishing jig lure has a fish hook mounted on a glass body with an epoxy resin. Light emitting particulates mixed with the epoxy resin emit visible light when subjected to an external light source.

13 Claims, 14 Drawing Sheets

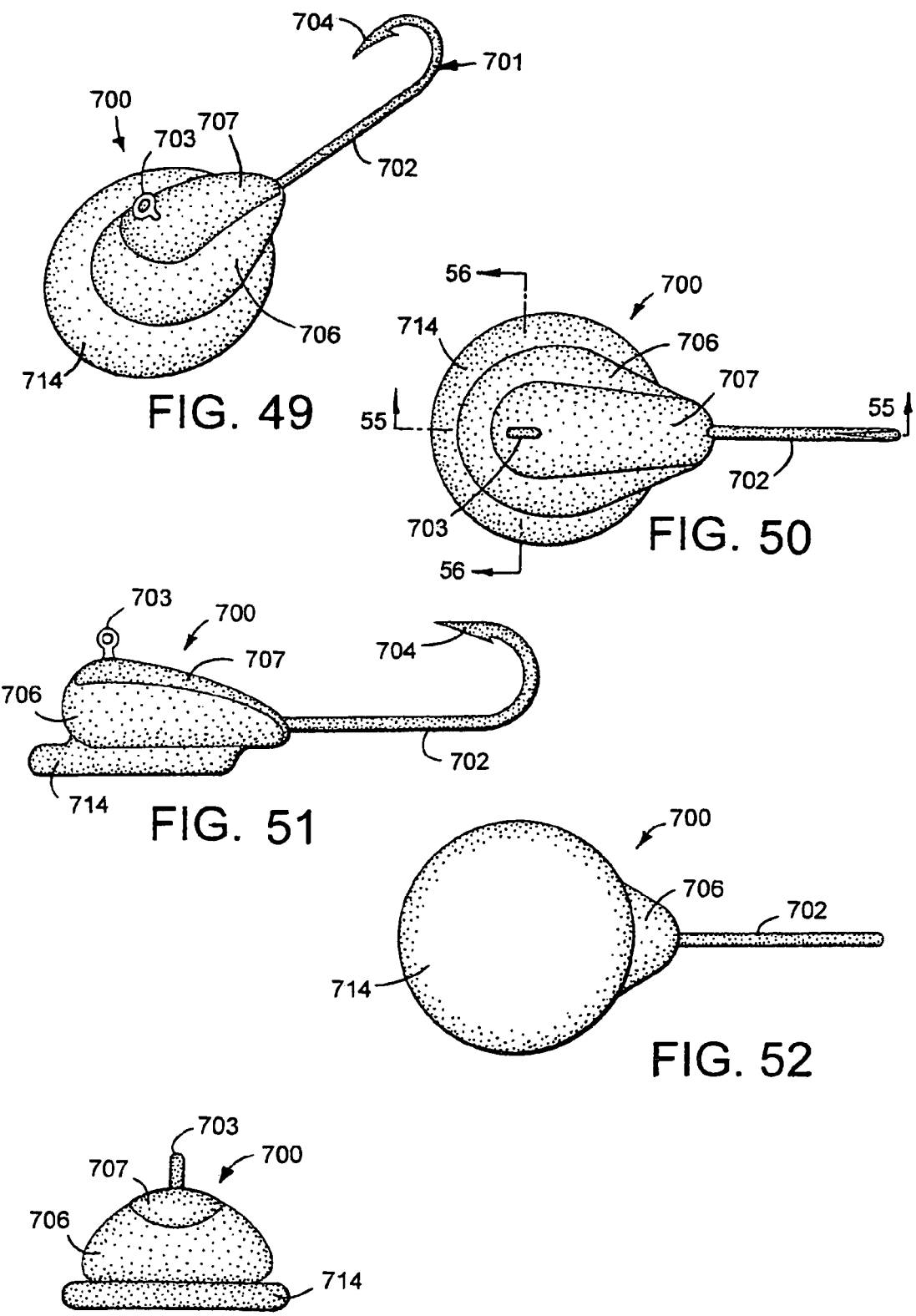

METHOD OF MAKING FISHING JIG LURE

CROSS REFERENCE TO RELATED APPLICATIONS

This application is a division of U.S. application Ser. No. 11/100,281 filed Apr. 6, 2005.

Application Ser. No. 11/100,281 claims the benefit of U.S. provisional application Ser. No. 60/559,706 filed Apr. 6, 2004.

FIELD OF THE INVENTION

The invention relates to fishing jig lures having fish hooks joined to head and methods of making fishing jig lures.

BACKGROUND OF THE INVENTION

A conventional fishing jig head has a fish hook joined to a lead head. The lead head surrounds the shank of the fish hook adjacent the eye. The head is coated with colored paint. Jigs are bottom fish lures which snag on rocks, water plants and roots. They detach from the fish line and settle on the bottom of the lake or river beds. Lead heads that remain in the lake and river beds are not environmentally compatible with wild water birds, such as ducks, geese and loons. A number of states have prohibited use of lead fishing weights and lures.

Examples of fishing lures are disclosed in the following U.S. patents.

Comisky in U.S. Pat. No. 5,245,783 discloses a fishing jig having a glass head connected to the shank of a fish hook. The head has a spherical shape with a longitudinal groove accommodating a section of the shank of the fish hook. A glue-like material including adhesive resins located in the groove secure the fish hook to the head.

Hirahara et al in U.S. Pat. No. 6,145,239 disclose a soft bait fishing lure having glass materials mixed in a lower section of the body of the lure. The glass materials reflect light.

Ellig in U.S. Pat. No. 6,318,016 describes and shows a luminous fishing lure. The lure has elongated fiber optics located in grooves in opposite sides of the body of the lure. The fiber optics are exposed to receive energy from material or artificial light sources. The forward ends of the fibers form a bulbous lens that focus the light to simulate eyes of a fish.

SUMMARY OF THE INVENTION

The fishing jig lure of the invention has a glass body joined to the shank or shaft of a fish hook with a plastic material having phosphorescent particulates that emit light after being stimulated by radiation. The glass body has a convex curved shape with a longitudinal top groove accommodating the shank of the fish hook. The plastic material is an epoxy adhesive that bonds to the glass and secures the fish hook to the glass body. The phosphorescent particulates are stimulated by light sources including sunlight, moonlight, flashlights, power flashers and ultraviolet light. The convex curved shape of the glass body magnifies the light from the phosphorescent particulates. The fishing jig lure is environmentally compatible as it does not have any lead or paint.

DESCRIPTION OF THE DRAWING

FIG. 49 is a sixth modification of the fishing jig lure of FIG. 1;

FIG. 50 is an enlarged top plan view of FIG. 49;

FIG. 51 is a side elevational view of FIG. 50;

FIG. 52 is a bottom plan view of FIG. 50;

FIG. 53 is a front elevational view of FIG. 50;

DESCRIPTION OF PREFERRED EMBODIMENTS OF FISHING JIG LURE

Figure 1:
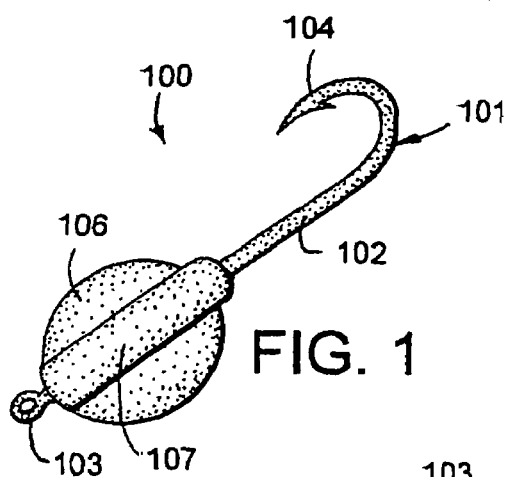
FIG. 1 is a perspective view of the fishing jig lure of the invention.
Figure 2:
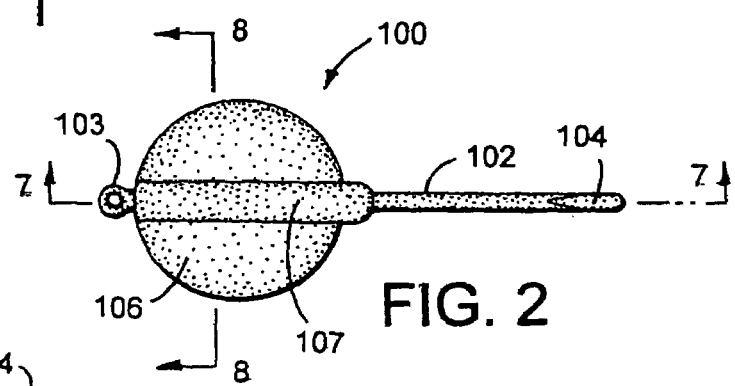
FIG. 2 is an enlarged top plan view thereof.
Figure 3:
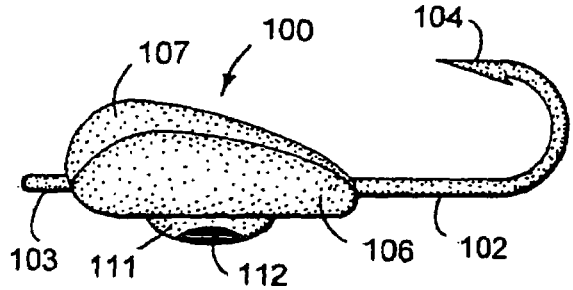
FIG. 3 is a side elevational view of FIG. 2.
Figure 4:
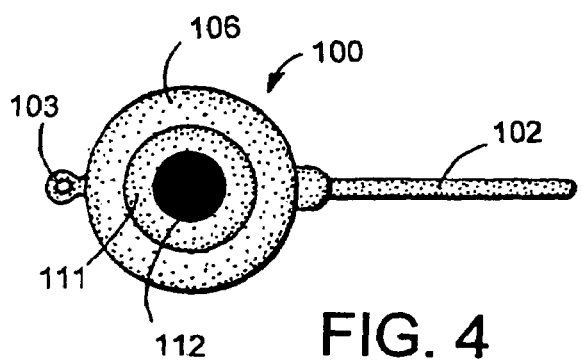
FIG. 4 is a bottom plan view of FIG. 2.
Figure 5:
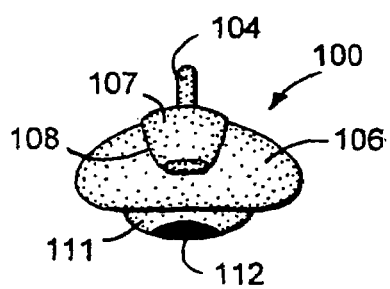
FIG. 5 is a front elevational view of FIG. 2.
Figure 6:
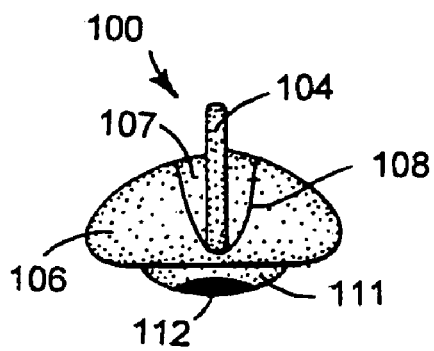
FIG. 6 is a rear elevational view of FIG. 2.
Figure 7:
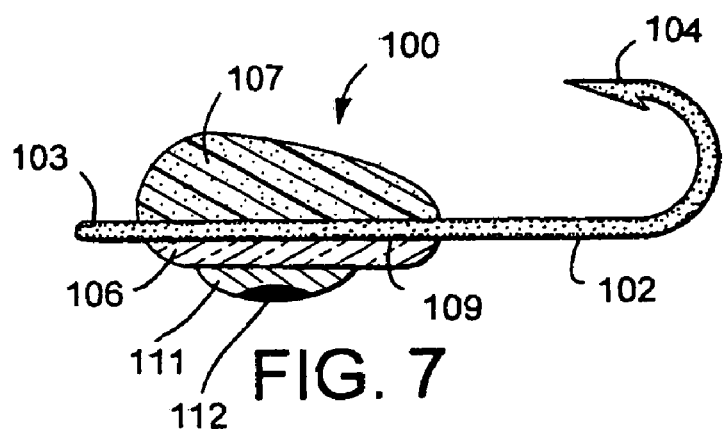
FIG. 7 is a sectional view taken along line 7-7 of FIG. 2.
Figure 8:
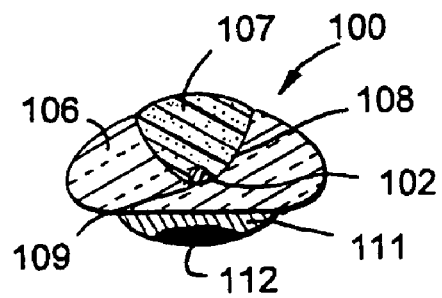
FIG. 8 is a sectional view taken along line 8-8 of FIG. 2.
Figure 9:
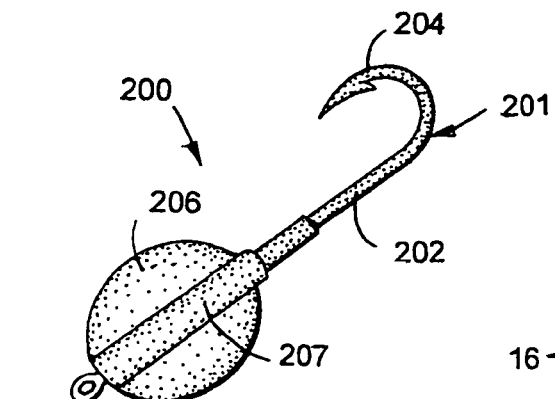
FIG. 9 is perspective view of a first modification of the fishing jig lure of FIG. 1.
Figure 10:
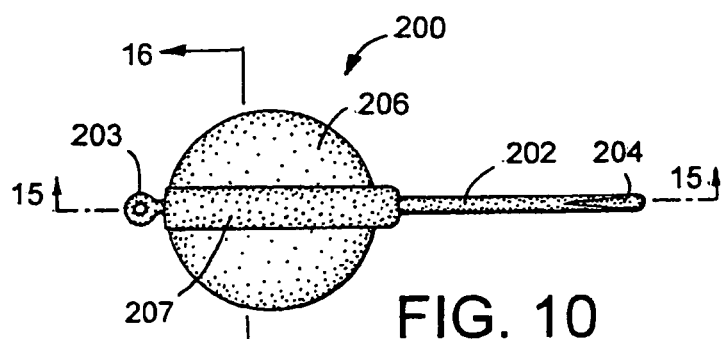
FIG. 10 is an enlarged top plan view of FIG. 9.
Figure 11:
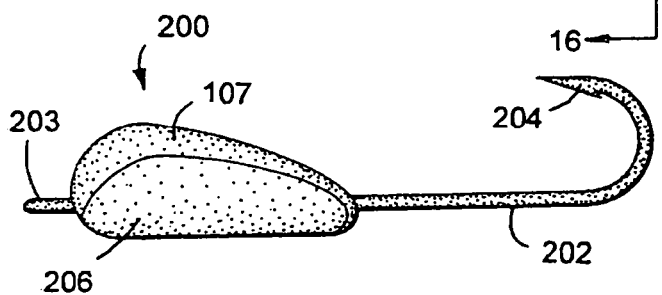
FIG. 11 is side elevational view of FIG. 10.
Figure 12:
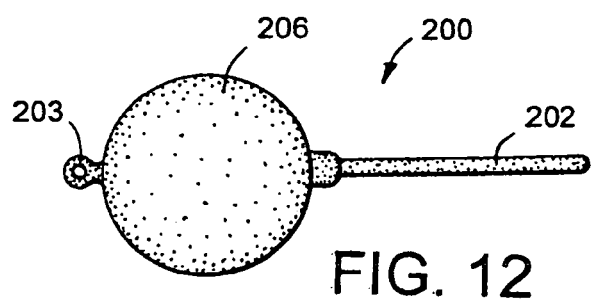
FIG. 12 is a bottom plan view of FIG. 10.
Figure 13:
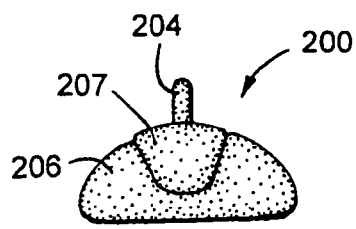
FIG. 13 is a front elevational view of FIG. 11.
Figure 14:
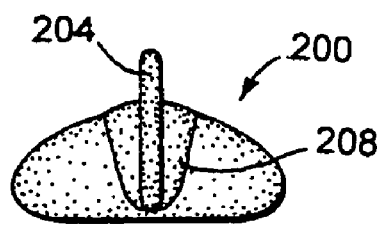
FIG. 14 is a rear elevational view of FIG. 10.
Figure 15:
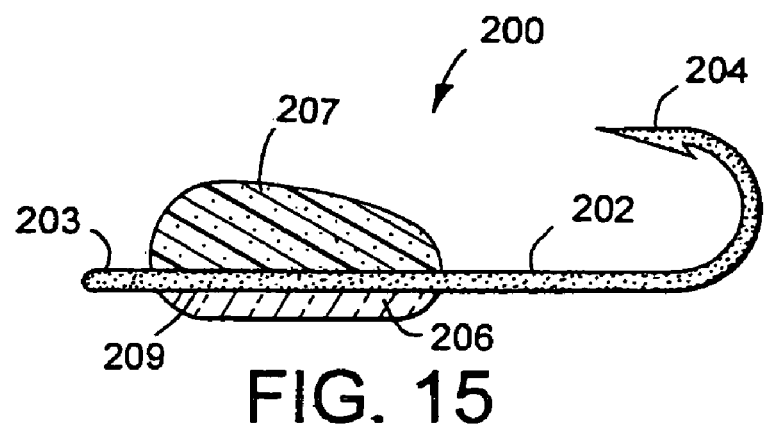
FIG. 15 is a sectional view taken along line 15-15 of FIG. 10.
Figure 16:
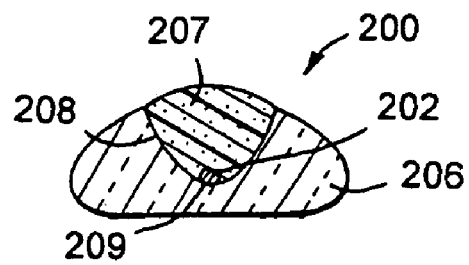
FIG. 16 is a sectional view taken along line 16-16 of FIG. 10.
Figure 17:
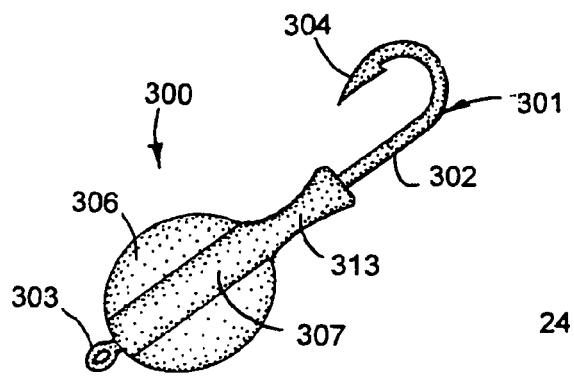
FIG. 17 is perspective view of a second modification of the fishing jig lure of FIG. 1.
Figure 18:
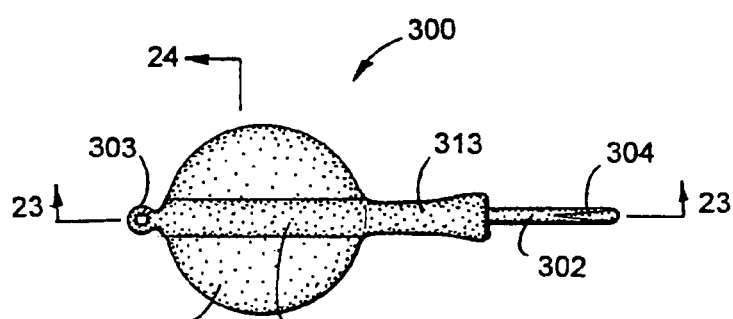
FIG. 18 is an enlarged top plan view of FIG. 17.
Figure 19:
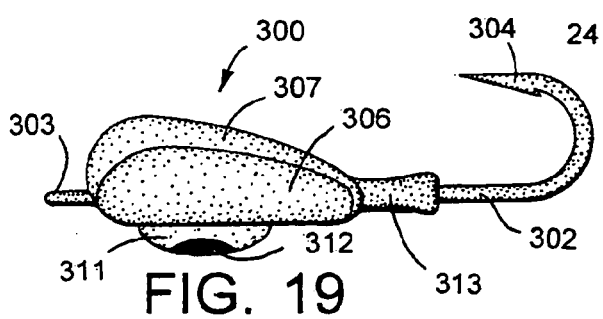
FIG. 19 is a side elevational view of FIG. 18.
Figure 20:
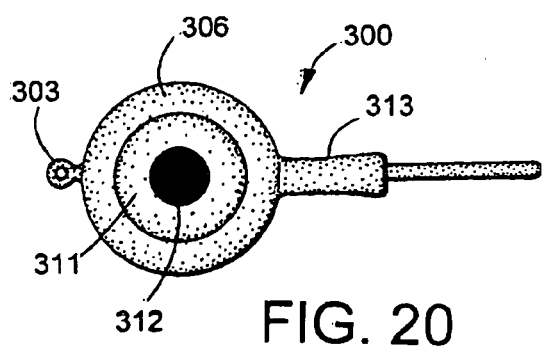
FIG. 20 is a bottom plan view of FIG. 18.
Figure 21:
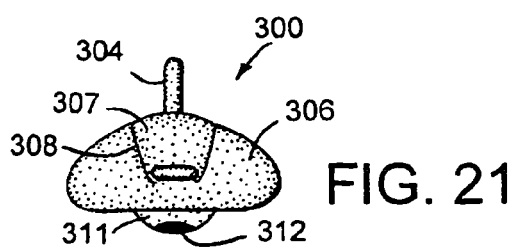
FIG. 21 is a front elevational view of FIG. 18.
Figure 22:
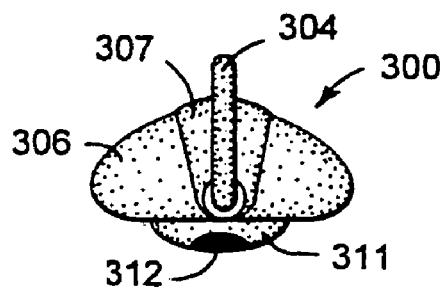
FIG. 22 is a rear elevational view of FIG. 18.
Figure 23:
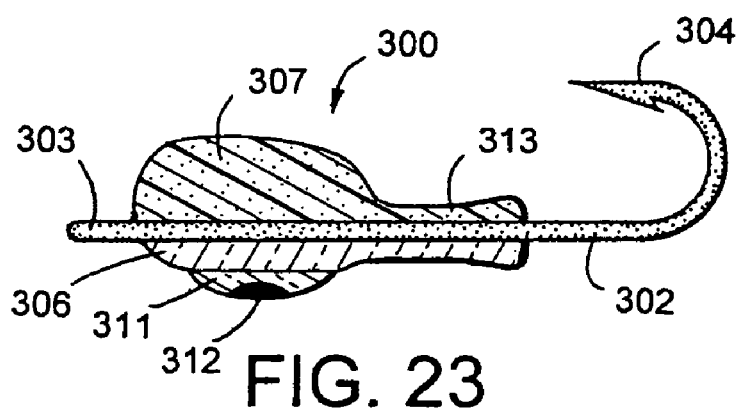
FIG. 23 is a sectional view taken along line 23-23 of FIG. 18.
Figure 24:
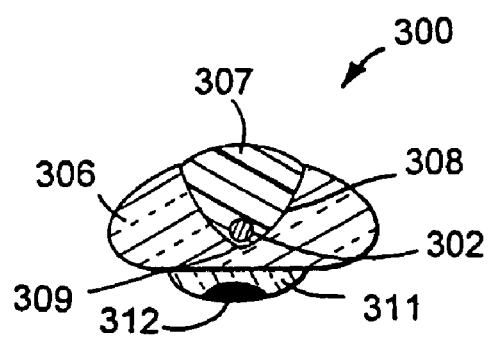
FIG. 24 is a sectional view taken along line 24-24 of FIG. 18.
Figure 25:
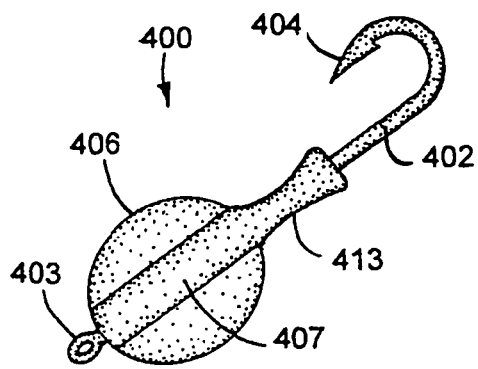
FIG. 25 is a perspective view of a third modification of the fishing jig lure of FIG. 1.
Figure 26:
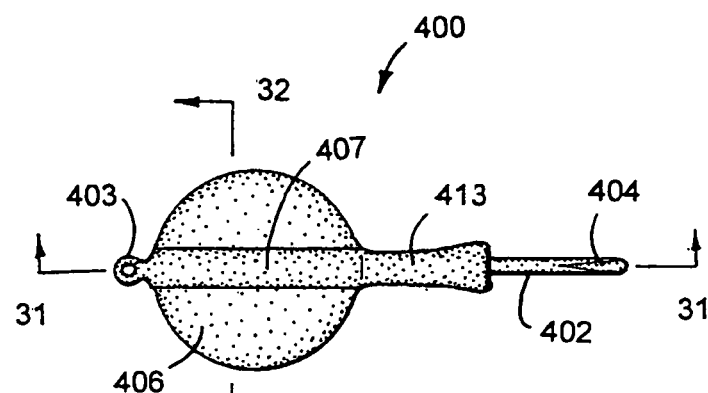
FIG. 26 is an enlarged top plan view of FIG. 25.
Figure 27:
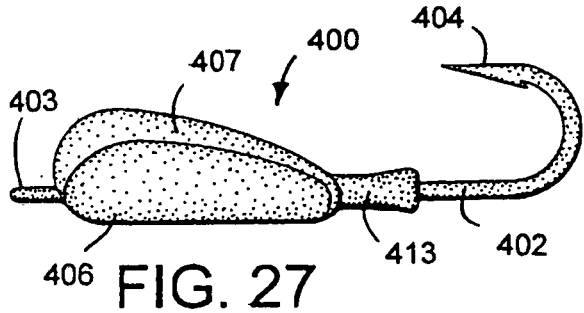
FIG. 27 is a side elevational view of FIG. 26.
Figure 28:
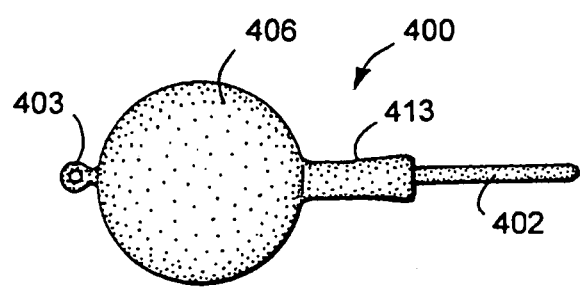
FIG. 28 is a bottom plan view of FIG. 26.
Figure 29:
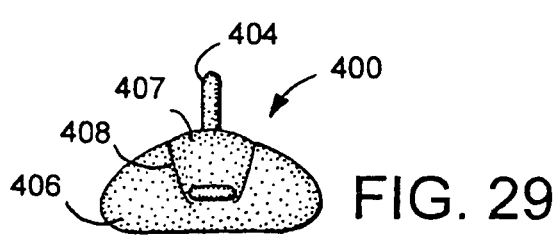
FIG. 29 is a front elevational view of FIG. 26.
Figure 30:
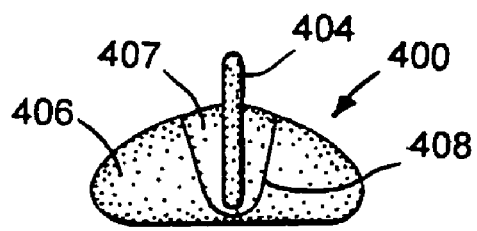
FIG. 30 is a rear elevational view of FIG. 26.
Figure 31:
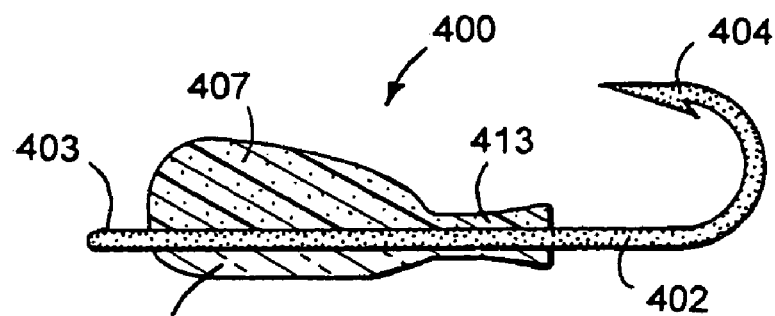
FIG. 31 is a sectional view taken along line 31-31 of FIG. 26.
Figure 32:
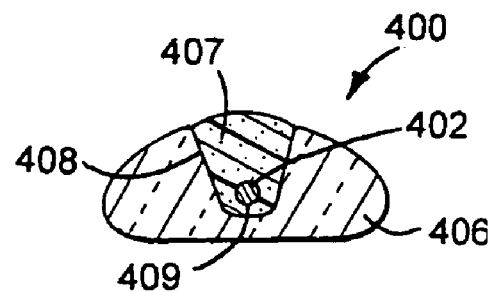
FIG. 32 is a sectional view taken along line 32-32 of FIG. 26.
Figure 33:
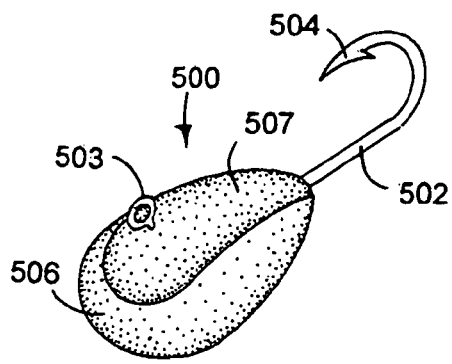
FIG. 33 is a fourth modification of the fishing jig lure of FIG. 1.
Figure 34:
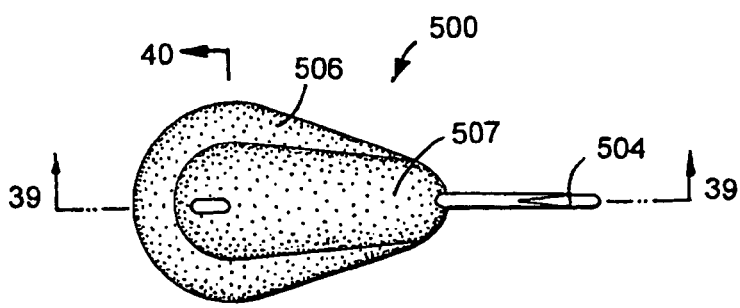
FIG. 34 is an enlarged top plan view of FIG. 33.
Figure 35:
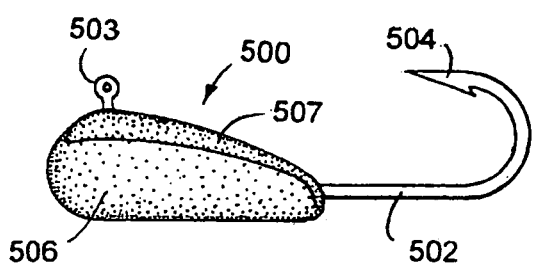
FIG. 35 is a side elevational view of FIG. 34.

The fishing jig lure indicated at 100 in FIG. 1 to 8 has a metal fish hook 101 comprising a linear longitudinal shank or shaft 102 joined at one end to an eye 103 and the opposite end to a forwardly turned hook 104. A round glass body 106 is secured to shank 102 adjacent eye 103. Eye 103 projects forwardly from the front of body 106. As seen in FIG. 3 the end of hook 104 is located in a plane above the horizontal plane of the top of body 106. An insert 107 of plastic material located in a longitudinal groove 108 in the top of body 106 is bonded to the glass of body 106 and retains shank 102 along the base or bottom 109 of groove 108. A semi-hemispherical projection 111 is joined to the bottom of body 106. Projection 111 can be a part of body 106. A color spot or circle is located on the center of projection 111.

Body 106 is a one-piece glass member. The glass is a mixture of silicon dioxide, sodium and calcium carbonate. A boron silicate glass is an example of the material of the glass member. The glass member can be transparent, clear, translucent, or colored. Groove 108 has a generally V-shape with base 109 along the longitudinal center of body 106.

Insert 107 is a two-part epoxy resin that bonds by polymerization to glass body 106 and shank 102 of fish hook 101. Color material can be added to the epoxy resin. Examples of colors are red, orange, blue, pink, gold, green, purple and chartreuse. Other colors can be included in the epoxy resin. The phosphorescent particulates are powder mineral zinc sulfide known as sphalerite or zincblende that are mixed with the epoxy resin. Zinc sulfide gives off light after being stimulated by radiation. The zinc sulfide particulates are phosphorescent as they have molecules that are excited by light to a higher electronic state and then undergo a radiation transition to a state of different multiplicity from which it decays to the ground state. The emitted light is normally of longer wavelength than the exciting light because vibrational energy has been dissipated. The epoxy resin and phosphorescent particulates do not include lead or other environmentally damaging materials.

The fishing jig lure 100 is made by heating the glass, such as a glass rod, to a semi-liquid state. Bodies of hot glass are deposited on a surface. A wedge shaped tool is used to make groove 108 in the top of the glass body 106. The glass body 106 is allowed to cool. The epoxy resin mixture containing the phosphorescent particulates is placed into the groove. The epoxy resin can be clear or colored. The shank 102 of the fish hook 101 is then inserted into the epoxy resin mixture and moved down to locate the shank 102 against the base 109 of groove 108. The epoxy resin is then allowed to cure to a hard state. The hard epoxy resin retains the fish hook 101 in a fixed position on the glass body.

In use the glass body 106 and epoxy resin insert 107 containing phosphorescent particulates is subjected to a light source, such as sunlight, a flash light, or power flasher. The light charges the phosphorescent particulates to a state where they emit light or glow. The effective glow has a time duration between 15 to 60 minutes. The color of the epoxy resin or color of the glass body determines the color of the light and duration of the glow. The fishing jig lure is in condition as a fish lure with or without live bait.

A first modification of the fishing jig lure, shown in FIG. 6 to 16, is identified by the number 200. The components of lure 200 that are the same as components of lure 100 have the same reference number with a prefix of 2. Lure 200 does not include projection 111 and color spot 112 joined to the bottom of body 206. The bottom of body 206 is flat between the convex curved side wall of body 206.

A second modification of the fishing jig lure, shown in FIGS. 17 to 24, is identified by the number 300. The components of lure 300 that are the same as lure 100 have the same reference number with a prefix 3. Lure 300 has a neck 313 extended rearwardly from body 306 around shank 302. Neck 306 has an enlarged rear end. Natural and plastic skirts (not shown) are connected to neck 302 to partly conceal hook 304.

A third modification of the fishing jig lure, shown in FIGS. 25 to 32, is identified by the reference number 400. The components of lure 400 that are the same as lure 100 have the same reference numbers with a prefix 4. Lure 400 has a neck 413 for accommodating a skirt and does not include projection 111 and color spot 112 joined to the bottom of body 406. The bottom of body 406 is flat between the convex curved side wall of body 406.

Figure 36:
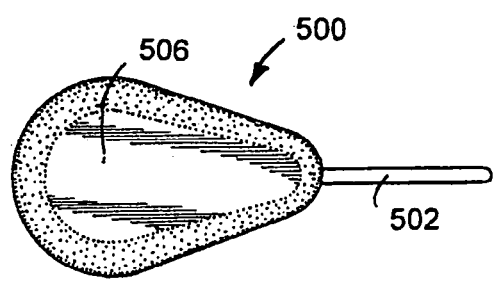
FIG. 36 is a bottom plan view of FIG. 34.
Figure 37:
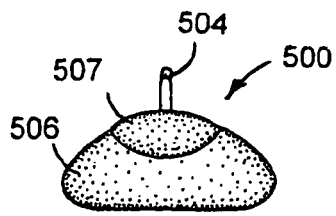
FIG. 37 is a front elevational view of FIG. 34.
Figure 38:
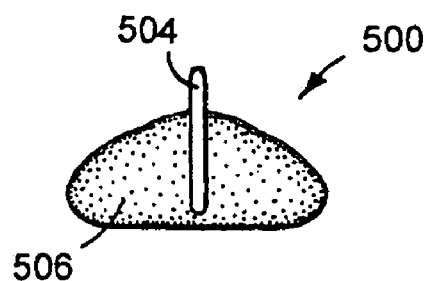
FIG. 38 is a rear elevational view of FIG. 34.
Figure 39:
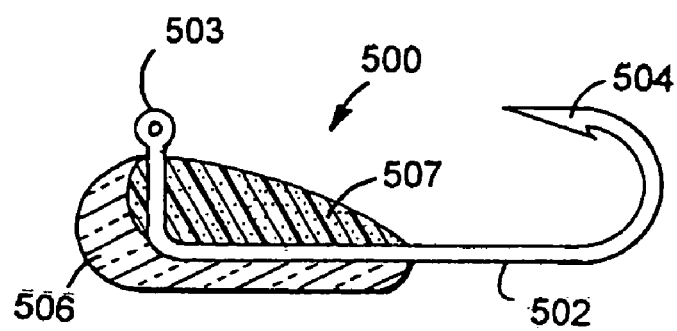
FIG. 39 is a sectional view taken along line 39-39 of FIG. 34.
Figure 40:
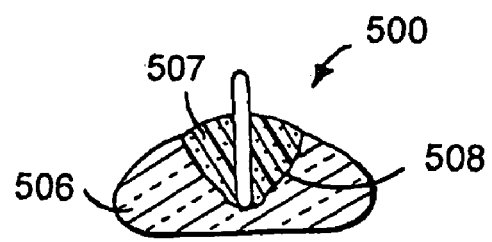
FIG. 40 is a sectional view taken along line 40-40 of FIG. 34.
Figure 41:
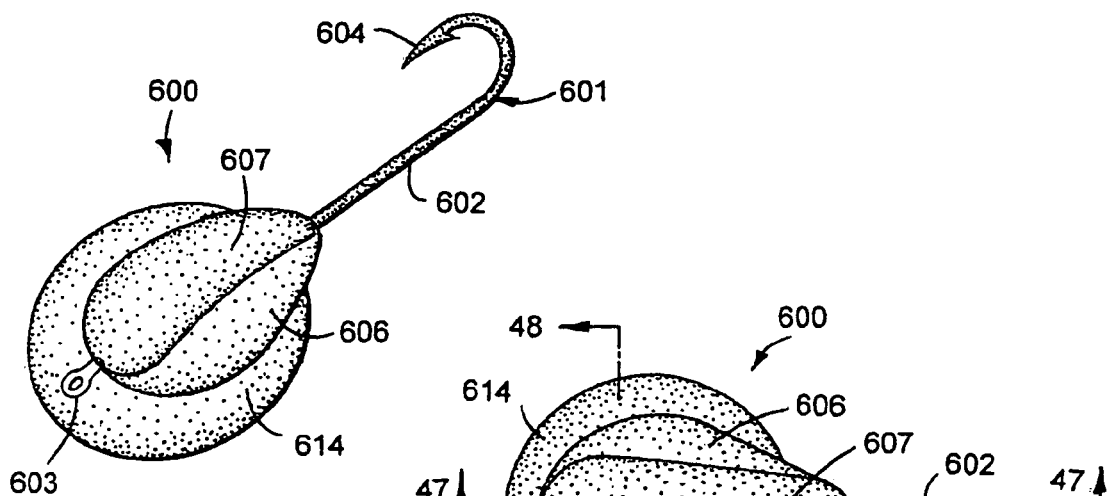
FIG. 41 is a fifth modification of the fishing jig lure of FIG. 1.
Figure 42:
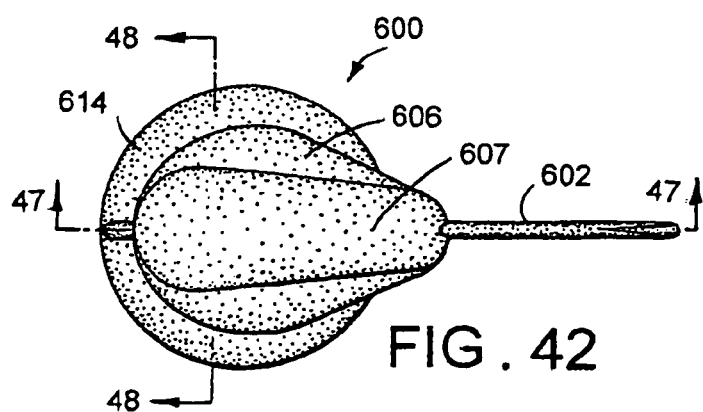
FIG. 42 is an enlarged top plan view of FIG. 41.
Figure 43:
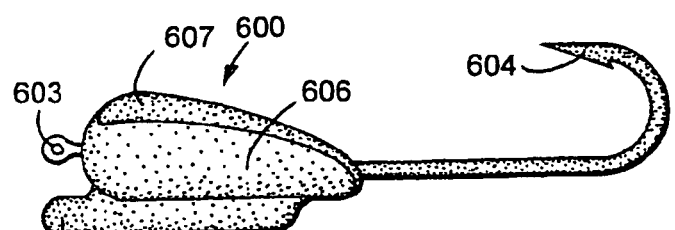
FIG. 43 is a side elevational view of FIG. 42.
Figure 44:
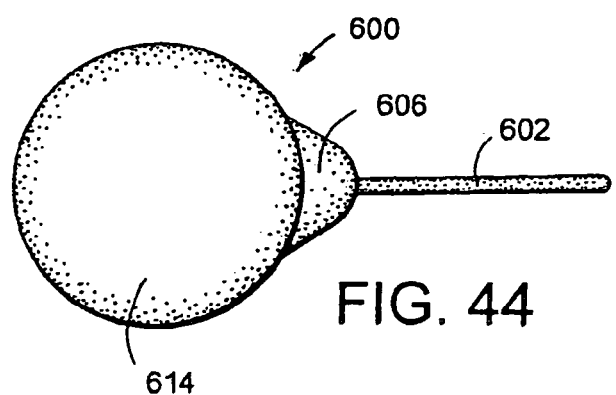
FIG. 44 is a bottom plan view of FIG. 42.
Figure 45:
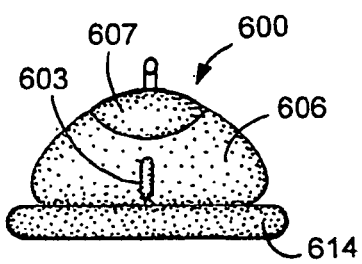
FIG. 45 is a front elevational view of FIG. 42.
Figure 46:
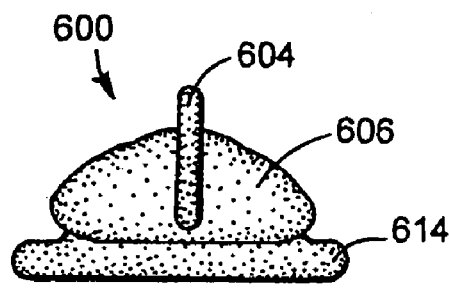
FIG. 46 is a rear elevational view of FIG. 42.
Figure 47:
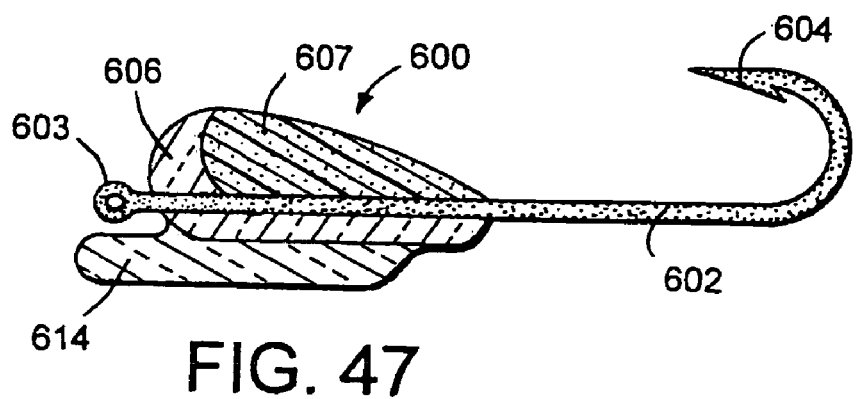
FIG. 47 is a sectional view taken along line 47-47 of FIG. 42.
Figure 48:
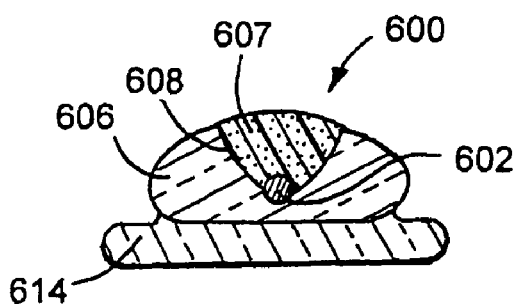
FIG. 48 is a sectional view taken along line 48-48 of FIG. 42.
Figure 54:
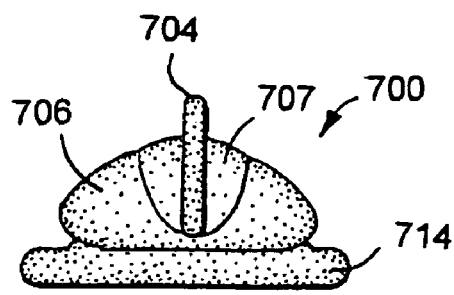
FIG. 54 is a rear elevational view of FIG. 50.
Figure 55:
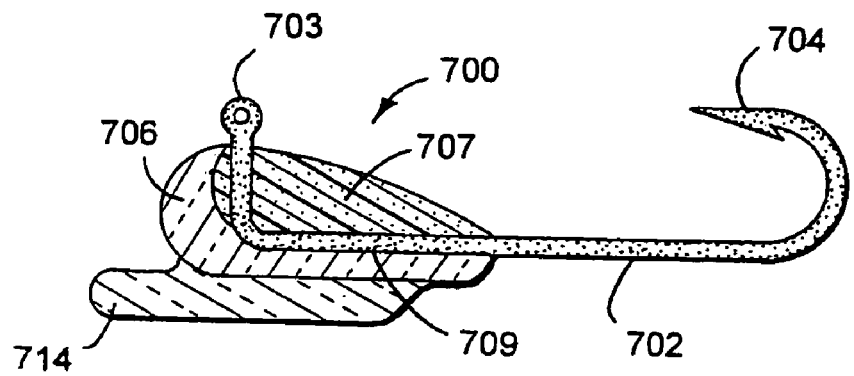
FIG. 55 is a sectional view taken along line 55-55 of FIG. 50.
Figure 56:
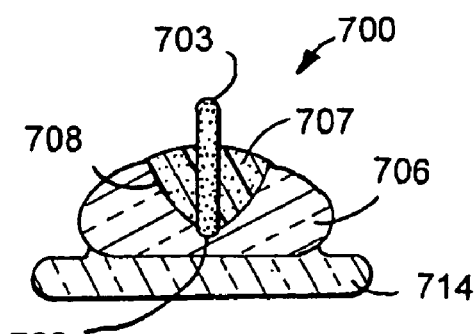
FIG. 56 is a sectional view taken along line 56-56 of FIG. 50.

A fourth modification of the fishing jig lure, shown in FIGS. 33 to 40, is identified by the reference number 500. The components of lure 400 that are the same as lure 100 have the same reference numbers with a prefix 5. The body 506 has a oval or tear drop shape with a large convex shaped front and side walls that taper inwardly to a convex shaped rear end. Eye 503 extends upwardly at about the radius center of the circular curvature of the front of body 506. The bottom of body 506, as shown in FIG. 36, is flat.

A fifth modification of the fishing jig lure, shown in FIGS. 41 to 48, is identified by the reference number 600. The components of lure 600 that are the same as lure 100 have the same reference number with the prefix 6. A circular disk 614 have a diameter larger than the diameter of body 606 is joined to the bottom of body 606. Disk 614 extends forwardly from the front of body 606 below eye 603. The outer side wall of disk 614 has a convex curved shape. Disk 614 is a glass member. Other materials, such as plastic, epoxy and ceramics can be used for disk 614. Disk 614 is secured with an adhesive to the bottom of body 606. Disk 614 can be part of body 606.

A sixth modification of the fishing jig lure, shown in FIGS. 49 to 56, is identified by the reference number 700. The components of lure 700 that correspond to the same components of lure 100 have the same reference numbers with a prefix 7. A disk 714 is secured to the bottom of body 706. Disk 714 is a glass member attached with an adhesive to body 706. Body 706 and disk 714 can be a one-piece glass member. Other materials, such as plastic, epoxy, and ceramics can be used for disk 714. The diameter of disk 714 is larger than the diameter of the front of body 706. The outer sides and front of disk 714 have rounded or convex curved shapes. The front of disk 714 is a lip that projects forwardly of the front of body 706. The eye extends upwardly from the forward portion of epoxy insert 707.

There has been shown and described a number of fishing jig lures. Changes in the structure of the lures and materials of the lure components can be made by a person skilled in the art within the scope of the invention.

The invention claimed is:

1. A method of making a fishing lure comprising: heating light transparent glass to a semi-liquid state to form a body of hot glass, forming a V-shaped groove having converging inside walls extended to a linear base at the bottom of the groove extended along the longitudinal center of the body in the body of hot glass, allowing the body of hot glass to cool, mixing an epoxy resin with light emitting phosphorescent materials, placing the mixture of epoxy resin and light emitting phosphorescent materials in the groove, guiding the shank of a fish hook with the inside walls of the groove into the mixture of epoxy resin and light emitting phosphorescent materials to locate the shank in engagement with the linear base of the body thereby positioning the shank of the fish lure along the longitudinal center of the body, and allowing the epoxy resin to cure into a hard state in the groove thereby retaining the fish hook in a fixed position with the shank of the fish hook along the longitudinal center of the body in the epoxy resin on the body of glass.

2. The method of claim 1 wherein: a glass rod is heated to a semi-liquid state to form a body of hot glass having a convex curved side wall on opposite sides thereof and a top wall joined to each side wall.

3. The method of claim 1 wherein: the groove is a linear groove formed in the top wall of the body of hot glass and said shank of the fish hook is inserted into the mixture of epoxy resin and light emitting phosphorescent materials in linear alignment with the linear groove.

4. The method of claim 1 including: mixing color material with the mixture of epoxy resin and light emitting phosphorescent materials and placing the mixture of color material, epoxy resin and light emitting phosphorescent materials in the groove.

5. The method of claim 1 wherein: the glass is heated to a semi-liquid state to form a body of hot glass having opposite convex curved side walls, a top wall and a generally flat bottom wall.

6. The method of claim 5 wherein: the groove is a linear groove formed in the top wall of the body of hot glass and said shank of the fish hook is embodied in the mixture of epoxy resin and light emitting phosphorescent materials in linear alignment with the linear base of the linear groove.

7. The method of claim 6 including: mixing color material with the mixture of epoxy resin and light emitting phosphorescent materials and placing the mixture of color material, epoxy resin and light emitting phosphorescent materials in the groove.

8. A method of making a fishing lure comprising: heating light transparent glass to a semi-liquid state to form a body of hot glass having convex curved side walls, a top wall and a generally flat bottom wall, depositing the body of hot glass on a surface to form said generally flat bottom wall, forming a V-shaped groove having converging inside walls extended to a linear base at the bottom of the groove extended along the longitudinal center of the body in the top wall of the body of hot glass, allowing the body of hot glass to cool, mixing an epoxy resin with light emitting materials, filling the groove with the mixture of epoxy resin and light emitting materials, guiding the shank of a fish hook along the inside walls into the mixture of epoxy resin and light emitting materials, positioning the shank of the fish hook in linear engagement with the linear base at the bottom of the groove thereby locating the shank of the fish hook along the longitudinal center of the body, and allowing the epoxy resin to cure into a hard state in the groove thereby retaining the fish hook shank in a fixed position in the epoxy resin and on the body of glass.

9. The method of claim 8 including: mixing color material with the mixture of epoxy resin and light emitting materials and placing the mixture of color materials, epoxy resin and light emitting materials in the groove.

10. The method of claim 8 including: locating the eye of the fish hook above the top wall with the shank of the fish hook embodied in the mixture of epoxy resin and light emitting materials.

11. A method of making a fishing lure comprising: heating light transparent glass to a semi-liquid state to form a body of hot glass having side walls, a top wall and bottom wall, depositing the body of hot glass on a flat surface to form a flat surface on the bottom wall, forming a V-shaped groove having downwardly converging inside walls extended to a linear base at the bottom of the groove located along the longitudinal center of the body in the top wall of the body of hot glass, allowing the body of hot glass to cool, mixing an epoxy resin with light emitting materials and color material, filling the groove with the mixture of epoxy resin, light emitting materials and color material, embodying the shank of a fish hook into the mixture of epoxy resin, light emitting materials, and color material, locating the shank of the fish hook along the linear base of the groove whereby the shank of the fish hook is positioned along the longitudinal center of the body, and allowing the epoxy resin to cure into a hard state in the groove thereby retaining the shank of the fish hook in a fixed position along the longitudinal center of the body in the epoxy resin on the body of glass.

12. The method of claim 11 wherein: a glass rod is heated to a semi-liquid state to form a body of hot glass having a convex curved side wall on opposite sides thereof and said top wall joined to each side wall.

13. The method of claim 11 including: locating the eye of the fish hook above the top wall with the shank of the fish hook embodied in the mixture of epoxy resin, light emitting materials and color material.

\* \* \* \* \*